United States Patent [19]

Meyer

[11] Patent Number: 4,734,290

[45] Date of Patent: * Mar. 29, 1988

[54] PROCESS FOR PREPARING A COATED-PARTICLE SALT SUBSTITUTE COMPOSITION

[75] Inventor: David R. Meyer, Chesterfield, Mo.

[73] Assignee: Mallinckrodt, Inc., St. Louis, Mo.

[*] Notice: The portion of the term of this patent subsequent to Dec. 3, 2002 has been disclaimed.

[21] Appl. No.: 808,306

[22] Filed: Dec. 12, 1985

[51] Int. Cl.$^4$ .............................................. A23L 1/237
[52] U.S. Cl. ........................................ 426/302; 426/96
[58] Field of Search .......................... 426/649, 302, 96

[56] References Cited

U.S. PATENT DOCUMENTS

| | | | |
|---|---|---|---|
| 3,391,003 | 7/1968 | Armstrong et al. | 99/56 |
| 3,967,039 | 6/1976 | Ninane et al. | 428/403 |
| 4,276,312 | 6/1981 | Merritt | 426/96 |
| 4,340,614 | 7/1982 | Pich et al. | 426/649 |
| 4,353,709 | 10/1982 | Nioh et al. | 23/313 FB |
| 4,497,845 | 2/1985 | Percel et al. | 426/646 |
| 4,511,592 | 4/1985 | Percel et al. | 426/646 |
| 4,536,418 | 8/1985 | Goldsmith | 427/213 |
| 4,556,566 | 12/1985 | Bell | 426/302 X |
| 4,556,567 | 12/1985 | Meyer | 426/302 X |
| 4,556,568 | 12/1985 | Meyer | 426/302 X |

FOREIGN PATENT DOCUMENTS

| | | |
|---|---|---|
| 0130821 | 1/1985 | European Pat. Off. . |
| 1304253 | 1/1973 | United Kingdom . |
| 1418868 | 12/1975 | United Kingdom . |

OTHER PUBLICATIONS

"Glatt Powder Coater/Granulators—GPCG", Glatt Air Techniques, Inc. brochure, 1982, 2 pages.
"Glatt Process Technology", Glatt Air Techniques, Inc. brochure, pp. 1–12, (undated–received at least as early as 12/11/84).
"Industrial Experience Drying and Granulation in Fluid Beds", S. Hovmand, Handout for Course, 4/25/83, pp. 1–32. (Course at East Brunswick, N.J.).
Mortensen and Hovmand, "Fluid-Bed Spray Granulation," CEP, Apr. 1983, pp. 37–42.
"Maltrin ® Maltodextrins Corn Syrup Solids," Grain Processing Corporation, Bulletin 11011, 11/81, 7 pages.
"Maltrin ® M100 Maltodextrin", Product Data Sheet 6011, 6/81, one page, Grain Processing Corporation.

Primary Examiner—Joseph Golian
Attorney, Agent, or Firm—R. J. Klostermann; L. N. Goodwin; Veo Peoples

[57] ABSTRACT

Disclosed is a process for preparing a coated-particle salt substitute composition wherein a flow of a gaseous medium is passed upwardly through a bed including potassium chloride particles at a velocity more than sufficient to form and maintain a fluidized bed of the particles. A spray of an aqueous solution including maltodextrin is introduced into the fluidized bed below its upper surface to form a coating of the solution on the fluidized particles. The velocity is sufficient to also establish a particle-flow zone above and adjoining the upper surface of the fluidized bed wherein a substantial portion of the coated particles are propelled out of the fluidized bed on a flow path extending thereabove and returning thereto.

6 Claims, No Drawings

PROCESS FOR PREPARING A COATED-PARTICLE SALT SUBSTITUTE COMPOSITION

The present invention relates to a process for preparing a coated-particle composition useful as a substitute for salt.

Salt substitute compositions which comprise coated particles wherein each particle comprises a core comprising potassium chloride and a maltodextrin-containing coating on the core are disclosed in U.S. Pat. Nos. 4,556,566 (Bell), 4,556,567 (Meyer) and 4,556,568 (Meyer). These patents are incorporated herein by reference. Various coatings in such compositions further include sodium chloride, cream of tarter (i.e. potassium bitartrate) and mixtures thereof as additional ingredients. These patents describe processes for preparing the compositions which include spraying an aqueous solution containing maltodextrin (and such additional ingredients where included) onto an agitated and heated bed of particles including potassium chloride.

It has been found that salt substitute compositions such as the compositions described in the abovementioned Bell and Meyer patents can be prepared by a fluidized-bed coating process. The process of this invention permits production of large-scale quantities of the salt substitute compositions with greater efficiency and greater freedom from agglomerate formation.

DESCRIPTION OF THE INVENTION

Generally stated, the present invention provides a process for preparing a salt substitute composition which comprises coated particles and not more than a minor amount of agglomerates, each particle comprising (a) a core comprising potassium chloride and
(b) a coating on said core, said coating comprising maltodextrin, and wherein the dextrose equivalent (D.E.) value of the combined amount of potassium chloride and maltodextrin is not more than 10 D.E. units, the potassium chloride is present in an amount from about 99 to about 60% and the maltodextrin is present in an amount from about 1 to about 40%, the percentage units being by weight and based on the weight of said combined amount. The process comprises (A) providing a bed of substantially dry particles comprising crystalline potassium chloride in a fluidization zone,
(B) passing and maintaining a flow of a gaseous medium upwardly through the bed at a velocity more than sufficient to form and maintain a fluidized bed of said particles,
(C) introducing a fine mist spray of an aqueous solution comprising maltodextrin into said fluidized bed below the upper surface of said fluidized bed to form a coating of said solution on the fluidized particles, said gaseous medium effecting evaporation of water thereinto from the particle-coated solution, said velocity being sufficient to also establish a particle-flow zone above and adjoining the upper surface of said fluidized bed wherein a substantial portion of the coated particles are propelled out of said fluidized bed on a flow path extending above said fluidized bed and returning to said fluidized bed, said path extending to a sufficient height above said surface such that the coated particles returned to said bed are substantially dry and do not contain more than a minor amount of agglomeration, (D) continuing to introduce said spray until substantially all said particles are coated with said coating, and
(E) continuing to pass said gaseous medium flow until substantially all the water introduced in said spray is removed by the gaseous medium exiting sequentially from said fluidization zone and from said particle-flow zone.

DETAILED DESCRIPTION OF THE INVENTION AND OF THE MANNER AND PROCESS OF MAKING AND USING IT

Although the present invention is not limited to specific apparatus in which the process is carried out, a preferred apparatus for the practice of the present invention comprises a fluidized bed chamber which is generally cylindrical in shape. The upper portion of the chamber is provided with an upwardly and outwardly tapering expansion zone, whereby the linear velocity of a flow of a gaseous medium at a given volumetric flow rate upwardly through the chamber progressively decreases with increasing elevation in the expansion zone. A supported screen of finer mesh than the to-be-coated core particles is provided across the bottom of the chamber for maintaining the bottom of the bed.

An inlet is provided at the bottom of the chamber, beneath the screen, for introducing a fluidizing and drying gaseous medium into the chamber. A second inlet is provided at the side of the chamber, above the screen, for introducing particulate crystalline potassium chloride (KCl)-containing core particles into the chamber. Below the level of the upper surface of the fluidized bed, there is provided a spray nozzle for spraying the maltodextrin-containing coating solution onto the KCl-containing particles, the latter being maintained in a fluidized condition in the bed by the fluidizing medium.

One such apparatus that can be employed is marketed by Glatt Air Techniques, Inc. as a powder coater/granulator Model GPCG 500. A similar apparatus is marketed by Aeromatic, Inc. of Bernardsville, N.J. Advantageously and unexpectedly, operation of the Model GPCG 500 and like apparatus in accordance with the process of this invention permits (and in preferred embodiment results in) preparation of salt substitute compositions which do not contain more than a minor amount of agglomerates (e.g. not more than 10 percent by weight based on the weight of the composition).

In operation, KCl-containing core particles, preferably substantially dry, are first introduced into the fluidized bed chamber to provide a bed of the particles in the fluidization zone, which extends upwardly from the screen. The core particles may be of any size suitable for fluidization, preferably from about 20 to about 70 mesh, U.S. Standard Sieve.

Thereafter, a flow of a fluidizing gaseous medium capable of evaporating water thereinto (preferably air) is passed upwardly through the provided bed at a linear velocity in the chamber at least sufficient to establish the fluidized bed. Such velocity is known to or readily determinable by those skilled in the art for a given amount, size and density of the KCl-containing core particles and a given chamber diameter.

After the fluidized bed is established, a fine mist spray of the aqueous solution or dispersion comprising water and maltodextrin dissolved or dispersed therein is introduced into the fluidized bed below the upper surface thereof, thereby forming a coating of the solution on the fluidized particles.

In general, decreasing the distance between the bottom of the fluidized bed and the location of spray introduction decreases the amount of agglomerates formed in the process of this invention. Preferably, the spray is introduced near the bottom of the fluidized bed, for example at a distance of about 16 inches or less above the bottom.

The flow of gaseous medium passes upwardly through the chamber and exits through an outlet near the chamber top. As the gaseous medium thus passes, it effects evaporation of water from the aqueous solution coated onto the particles, thereby drying the applied coating and carrying the evaporated water out of the chamber in the exiting gaseous medium.

The amount of potassium chloride in the fluidized bed and the amount of maltodextrin (and, where included, sodium chloride, cream of tartar or a combination thereof) contained in the solution are selected such that the finished product includes these ingredients in the amounts set forth above.

The velocity of the gaseous medium flowing through the chamber is also sufficient to establish a particle-flow zone above and adjoining the upper surface of the fluidized bed. In this zone a substantial portion of the particles having the aqueous maltodextrin-containing solution coated thereon are propelled or ejected by the flowing gaseous medium out of the fluidized bed. The propelled particles proceed on a flow path extending above the fluidized bed and returning to the fluidized bed. The flow path extends to a sufficient height above the upper surface of the fluidized bed such that the particles which return to the fluidized bed are substantially dry and do not contain more than a minor amount of agglomerates.

It has been found that, in general, increasing the velocity above that required to merely establish the fluidized bed decreases the amount of agglomerates formed in the process of this invention. Advantageously, the velocity is sufficiently high such that the height of the flow path extends substantially to the top of the fluidized-bed chamber, which includes the expansion chamber in the above-mentioned preferred apparatus.

As a general preference, the velocity of the gaseous medium (e.g. air) entering the fluidization chamber is at least 625 feet per minute and more preferably at least 700 (e.g. about 700 to about 760) feet per minute.

Preferably, the fluidizing medium, for example air, is introduced into the chamber at an elevated temperature to increase the rate of evaporation of moisture into the medium from the maltodextrin-containing coating solution applied to the surface of the fluidized core particles. Although the fluidizing medium supplied to the chamber can be at any temperature effective for evaporating water from the applied coating provided that it is not so hot that it results in hydrolytic breakdown or discoloration of the maltodextrin or other adverse interference with the utility as a salt substitute of the composition being prepared, such temperature is preferably from about 60° C. to about 115° C., and more preferably from about 60° C. to about 90° C.

The temperature of the coating solution is preferably at least 100° F. and more preferably is from about 140° F. to about 180° F. The coating solution is sprayed through a spray system suitable for providing a fine mist spray of the solution and preferably suitable for distributing the spray droplets across substantially an entire horizontal cross section of the fluidized bed. By way of example, it is pumped into the fluidized bed chamber through a binary nozzle (e.g. 6-headed nozzle model 937-S32 manufactured by Schlick Co., having a port size of 1.2-2.5 mm) at a suitable flow rate and an atomization pressure sufficient to obtain a fine mist spray.

The aqueous solution may contain any suitable concentrations of the coating materials (i.e., maltodextrin and, where included, sodium chloride and/or cream of tartar) and may be employed in any suitable amount relative to the amount of potassium chloride being coated such that the dextrose equivalent of the resulting coated composition is not more than 10 D.E. units. As a general preference, the solution is relatively dilute (containing the maltodextrin in an amount of, for example, from about 25% to about 37%).

Solution flow rates which are acceptable are dependent on the concentration of coating material in the solution and on the temperature and flow rate of the fluidizing gaseous medium. The solution flow rate should not be greater than that rate at which the fluidizing medium can effectively remove the water from the aqueous coating on the coated particles with not mpore than a minor amount of agglomeration. In order to maximize the production rate of the composition, the solutin flow rate used is the maximum acceptable rate under the conditions employed. The solution employed must be of sufficiently low viscosity to be pumpable at the desired rate through the nozzle (or other spray-forming device) employed.

Solutions which are more dilute than necessary to provide an acceptable viscosity for spray-coating are preferably avoided since the additional water may slow the production rate of suitably dry product. Solutions above about 40% solids concentration are generally too viscous for forming fine mist sprays.

The inlet air temperature should not be so high as to evaporate an appreciable amount of water from the coating spray before the spray contacts the fluidized core particles.

The flow-path height to which at least a substantial portion of the fluidized particles are propelled is advantageously at least 2 feet, preferably at least 4 feet (and more preferably is about 6 feet), above the upper surface of the fluidized bed. In most commercially available apparatus suitable for carrying out the process in large-scale quantities, e.g. producing about 500. to 2000. pound batches, it is preferable to employ a sufficient velocity such that the flow-path height is equal to at least 90% of the distance between the upper surface of the fluidized bed and the top of the chamber.

Introduction of the spray is continued until substantially all the fluidized particles are coated with the coating. The amount of spray employed is determined by the amount of coating ingredients desired for a given salt substitute composition.

The flow of the fluidizing gaseous medium is continued until substantially all the water introduced in the spray is removed by the gaseous medium exiting sequentially from the fluidized bed and the particle flow zone. In general, continuing such flow for about 5 to about 30 minutes aids in assuring such removal, whereby the resulting dried coating of the coated-particle product effectively coats the core and, in general, the product contains not more than about one percent water.

The finished product can then be recovered by discharging it from the fluidized bed chamber.

Preferred conditions are set forth below for carrying out the process in the preferred commercially available apparatus, i.e. the powder coater/granulator Model GPCG 500 (manufactured by Glatt Air Techniques) but modified with a 6-headed nozzle Model 937-S32 (manufactured by Schlick Co.):

(1) KCl batch size: at least 1690 pounds
(2) Fluidizing Medium: Air, entering velocity of at least 625 ft./min. (preferably about 700–760 ft./min.), corresponding to approximate volumetric flow rate of at least 8260 cubic feet/minute (cfm), (preferably about 9250–10,040 cfm); inlet temperature—about 60°–115° C. (preferably about 60°–90° C.)
(3) Nozzle: atomization air pressure 5 Bar minimum (preferably about 8.5 Bar)
(4) Coating Solution: flow rate—1,000–2,000 cc/min.) at 25–37% maltodextrin concentration;
(5) Nozzle Position: 7 inches or less above the bottom of the expansion chamber (and below the upper surface of the fluidized bed)
(6) Equidistant nozzle ports oriented downwardly about 30° from the vertical
(7) Fluid Bed Temperature: about 66°–84° C.
(8) Outlet Gas Temperature: about 64°–83° C.

The salt substitute of the present invention contains at least two essential components, namely potassium chloride and maltrodextrin, as indicated above. In addition the coating may include sodium chloride and/or cream of tartar. In general, these components may be combined in any relative proportions in accordance with the teachings hereof to prepare a broad range of salt substitutes useful for a wide variety of end use applications, e.g., for table salt, inclusion in snack foods (e.g., pretzels, potato chips (potato crisps), corn chips (corn crisps), etc.), cereals, baked goods and other edible compositions such as those which heretofore have included common salt (i.e., sodium chloride) as an ingredient thereof. In use, the salt substitutes of the present invention may be substituted in whole or in part for the common salt component of heretofore known edible compositions.

When the salt substitute includes only the two components potassium chloride and maltrodextrin these may be present in the below indicated amounts:
  potassium chloride: from about 99 to about 60%,
  maltrodextrin: from about 1 to about 40%, wherein the percentage amounts are by weight based on the combined weight of said components.

As a general preference, the potassium chloride component in such a two component composition is included in an amount from about 90 to about 70% and the maltodextrin component is included in an amount from about 10 to about 30% wherein the percentage amounts are by weight based on the combined weight of these components.

More preferably, the potassium chloride is included in such a two component composition in an amount from about 85 to about 80% and the maltodextrin is included in an amount from about 15 to about 20%, such percentages being by weight and on the aforesaid basis (i.e., the combined total weight of these components being 100% by weight).

When the salt substitute includes the three components potassium chloride, maltrodextrin and sodium chloride these may be present in the below indicated amounts:
  potassium chloride: from about 90 to about 19%,
  maltodextrin: from about 1 to about 40%, and
  sodium chloride: from about 0.1 to about 75%,
wherein the percentage amounts are by weight based on the combined weight of said ingredients.

As a general preference, the potassium chloride component is included in such a three component composition in an amount from about 90 to about 20%, the maltodextrin component is included in an amount from about 10 to about 30%, and the sodium chloride component is included in an amount from about 1 to about 50%, wherein the percentage amounts are by weight based on the combined weight of the three components set forth above.

More preferably, the potassium chloride is included in such a three component composition in an amount from about 85 to about 65%, the maltodextrin is included in an amount from about 15 to about 20%, and the sodium chloride is included in an amount from about 3 to about 15%, such percentages being by weight and on the aforesaid basis (i.e., the combined total weight of these three components being 100% by weight).

When the salt substitute includes the three components potassium chloride, maltrodextrin and cream of tartar these may be present in the below indicated amounts:
  potassium chloride: from about 91 to about 59%,
  maltodextrin: from about 1 to about 40%, and
  cream of tartar: from about 0.1 to about 0.9%,
wherein the percentage amounts are by weight based on the combined weight of said ingredients.

As a general preference, the potassium chloride component is included in such three component compositions in an amount from about 90 to about 69%, the maltodextrin component is included in an amount from about 10 to about 30%, and the cream of tartar component is included in an amount from about 0.1 to about 0.7%, wherein the percentage amounts are by weight based on the combined weight of these components.

More preferably, the potassium chloride is included in an amount from about 85 to about 80%, the maltodextrin is included in an amount from about 15 to about 20%, and the cream of tartar is included in an amount from about 0.1 to about 0.5%, such percentages being by weight and on the aforesaid basis (i.e., the combined total weight of these three components being 100% by weight).

For human consumption of the salt-substitute compositions, all ingredients employed should be humanly edible, e.g., Food Chemical Codex grade.

The salt substitutes may be prepared from raw material ingredients having any suitable particle sizes.

Any suitable maltodextrin may be employed as the maltodextrin component. The maltodextrin employed is preferably a water-soluble maltodextrin having at least a major portion (e.g., slightly more than 50%, preferably about 60% or more) of one or more polysaccharides having a D.P. (i.e., degree of polymerization) of at least 10. More preferably, the maltodextrin employed is additionally a starch hydrolyzate of low sweetness having a low dextrose equivalent value of from about 5 to about 20, more preferably about 5 to about 15 D.E. units, high water solubility with substantial freedom from haze and low hygroscopicity. The most preferred maltodextrin employed herein is that commercially available from Grain Processing Corporation (GPC), Muscatine, Iowa, under the designation MALTRIN ® M100 maltodextrin. According to the "Typical Analysis" in GPC Bulletin 11011 entitled MALTRIN Maltodextrins & Corn Syrup Solids, M100 maltodextrin has a D.E. of about 9-12 D.E. units and a "Carbohydrate Composition, % (db)" as follows: dextrose (1.0), disaccharides (4.0), trisaccharides (6.0) and "tetrasaccharides & higher" (89.0). According to GPC Product Data Sheet 6011 for MALTRIN M100 maltodextrin, the M100 has a "Typical Carbohydrate Profile (dry basis) in % as follows: monosaccharides (1%), disaccharides (4%), trisaccharides (6%), tetrasaccharides (5%) and "pentasaccharides & above" (84%).

According to GPC Bulletin 9102 relating to "Carbohydrate Profile" of MALTRIN maltodextrins and corn syrup solids, M100 maltodextrin has the following "Typical Carbohydrate Profile":

| Saccharides-by Degree | Amount % | |
| of Polymerization | Average | Range |
|---|---|---|
| DP1 | 0.5 | 0.3-0.8 |
| DP2 | 2.7 | 2.3-2.9 |
| DP3 | 4.3 | 4.2-5.0 |
| DP4 | 3.7 | 3.3-4.1 |
| DP5 | 3.1 | 2.7-3.4 |
| DP6 | 5.0 | 0.7-6.0 |
| DP7 | 7.1 | 6.5-8.3 |
| DP8 | 4.5 | 4.2-5.3 |
| DP9 | 3.1 | 2.8-3.6 |
| DP10 | 1.6 | 0.6-2.9 |
| Above DP10 | 64.4 | 56.8-68.1 |

The above GPC bulletins and data sheet are incorporated herein by reference.

Maltodextrins suitable for use herein may be prepared, for example, in accordance with the methods disclosed in U.S. Pat. Nos. 3,560,343; 3,663,369; 3,849,194; and 4,298,400. These patents are incorporated herein by reference.

Cream of tartar suitably included herein is commercially available from McCormick & Co. (Baltimore, Md.). In general, cream of tartar is preferably included in an amount of about 0.33%.

Advantageously, salt-substitute compositions of the present invention containing potassium chloride, maltodextrin and cream of tartar can be made as "salt-free" (i.e., free of sodium chloride) salt substitutes having highly suitable taste. Alternatively, in embodiments of the invention sodium chloride can be included in the salt-substitute particles (in addition to potassium chloride, maltodextrin and cream of tartar), preferably in the coating mixture. In such embodiments sodium chloride can be included in any effective amount. The amounts of the components in these embodiments may be, for example:

potassium chloride: from about 91 to about 19%,
maltodextrin: from about 1 to about 40%,
cream of tartar: from about 0.1 to about 0.9%, and
sodium chloride: up to about 50% wherein the percentage amounts are by weight based on the combined weight of said components.

As a general preference, the potassium chloride component is included in such four component embodiments in an amount from about 91 to about 19%, the maltodextrin component is included in an amount from about 10 to about 30%, the cream of tartar component is included in an amount from about 0.1 to about 0.7%, and the sodium chloride component is included in an amount from about 0.1% to about 50% wherein the percentage amounts are by weight based on the combined weight of the four components set forth above.

More preferably, the potassium chloride is included in an amount from about 85 to about 65%, the maltodextrin is included in an amount from about 15 to about 20%, the cream of tartar is included in an amount from about 0.1 to about 0.5%, and the sodium chloride is included in an amount from about 0.1 to about 15%, such percentages being by weight and on the aforesaid basis (i.e., the combined total weight of these four components being 100% by weight).

In the salt substitute compositions prepared by the process of this invention, the dextrose equivalent (D.E.) value of the combined amount of potassium chloride, maltodextrin and optionally included sodium chloride and/or cream of tartar coating ingredients is preferably not more than 10 D.E. units.

Practice of the present invention is illustrated by the following nonlimiting examples. All parts and percentages given throughout this disclosure including the examples and claims appended hereto, are by weight unless otherwise indicated.

EXAMPLE 1

In this example, potassium chloride was coated with a solution containing maltodextrin, sodium chloride, and cream of tartar (potassium bitartrate). The solution had a solids content of about 40%. The coating was carried out in a Glatt spray granulator model "WSG 300". Processing data was as shown in Table I.

In this example (and unless otherwise indicated in those which follow) the solution spray nozzle was below the upper surface of the fluidized bed.

TABLE I

| | |
|---|---|
| Amount of potassium chloride charged to granulator bowl: | 922 lb. |
| Potassium chloride particle size: | |
| On U.S. Std. 20 mesh: | <.1% |
| On U.S. Std. 25 mesh: | <.1% |
| On U.S. Std. 30 mesh: | 0.3% |
| On U.S. Std. 35 mesh: | 6.7% |
| On U.S. Std. 50 mesh: | 82.2% |
| On U.S. Std. 60 mesh: | 6.3% |
| THRU U.S. STD. 60 mesh: | 4.4% |
| Amount of coating: | 401.4 lbs. |
| Amount of each coating ingredient: | |
| Maltodextrin | 198.5 lb. |
| Sodium Chloride | 198.5 lb. |
| Cream of Tartar | 4.4 lb. |
| Amount of water in coating solution: | 595.4 lb. |
| Temperature of coating solution: | 55-80° C. |
| Solution application rate: | 4.24 lb./Min. |
| Granulator temperature profile used: | |
| Product/Solids temperature in bowl: | 57-59° C. |
| Outlet air temperature: | 55-57° C. |
| Inlet air temperature: | 83-88° C. |
| Spraying time: | 235 Min. |
| Final product particle size: | |
| On U.S. Std. 20 mesh: | 8.4% |
| On U.S. Std. 25 mesh: | 10.7% |
| On U.S. Std. 30 mesh: | 26.0% |
| On U.S. Std. 35 mesh: | 25.3% |
| On U.S. Std. 50 mesh: | 28.2% |
| On U.S. Std. 60 mesh: | 0.8% |
| THRU U.S. STD. 60 mesh: | 0.6% |
| Fluid Bed Machine Data: | |
| Fluidization air velocity at distributor plate: | 613 Ft./Min. |
| Nozzle Used: Schlick 6-Headed with 1.8 mm liquid orifices | |
| Nozzle atomization air pressure: | 4.7-5.0 bar |

TABLE I-continued

"Nozzle Position": 7" above bottom flange
of expansion chamber

After completion of the spraying cycle, the potassium chloride to coating ratio was about 70:30. After removal of the particles larger than 20 mesh by sifting, the product passed all appearance and taste panel control tests. Most of the increase in particle size was due to the expected build-up of coating on the potassium chloride crystals. The coating under microscopic examination appeared uniformly and smoothly applied.

EXAMPLE 2

In this example, potassium chloride was coated with a solution containing maltodextrin, and cream of tartar (potassium bitartrate). The solution had a solids content of about 37%. Again the coating was carried out in a Glatt Spray Granulator Model "WSG 300". Processing data was as shown in Table II.

TABLE II

| | |
|---|---|
| Amount of potassium chloride charged to granulator bowl: | 1119 lb. |
| Potassium chloride particle size - same as in Table I. | |
| Amount of coating: | 204.4 lbs. |
| Amount of each coating ingredient: | |
| Maltodextrin | 198.45 lb. |
| Cream of Tartar | 5.95 lb. |
| Amount of water in coating solution: | 352.8 lb. |
| Temperature of Coating Solution: | 55–80° C. |
| Solution application rate: | 3.74 lb/min. |
| Fluid bed machine temperature Profile used: | |
| Product/Solids temperature in bowl: | 57–60° C. |
| Outlet air temperature: | 57–59° C. |
| Inlet air temperature: | 83–84° C. |
| Spraying Time: 149 min. | |
| Final Product Particle Size: | |
| On U.S. Std. 20 mesh: | 5.9% |
| On U.S. Std. 25 mesh: | 5.5% |
| On U.S. Std. 30 mesh: | 17.3% |
| On U.S. Std. 35 mesh: | 22.6% |
| On U.S. Std. 50 mesh: | 47.0% |
| On U.S. Std. 60 mesh: | 1.1% |
| Thru U.S. Std. 60 mesh | 0.6% |
| Fluid Bed Machine Data - Same as in Table I. | |

EXAMPLE 3

In this example, potassium chloride was again coated with a solution equivalent in composition to that used in Example 1. The coating was carried out on a Glatt Powder Coater/Granulator Model GPCG 500. Processing data and results were as shown in Table III.

TABLE III

| | |
|---|---|
| Amount of potassium chloride charged to Fluid Bed Machine bowl: | 1691 lb. |
| Potassium chloride particle size: | |
| On U.S. Std. 20 mesh: | <0.1% |
| On U.S. Std. 25 mesh: | <0.1% |
| On U.S. Std. 30 mesh: | <0.1% |
| On U.S. Std. 50 mesh: | 90.5% |
| On U.S. Std. 60 mesh: | 8.5% |
| On U.S. Std. 70 mesh: | 0.6% |
| Thru U.S. Std. 70 mesh | 0.4% |
| Amount of coating: | 309 lbs. |
| Amount of each coating ingredient: | |
| Maltodextrin | 300 lb. |
| Cream of Tartar | 9 lb. |
| Amount of water in coating solution: | 534.1 lb. |
| Temperature of Coating Solution: | 55–80° C. |
| Solution application rate: | 4.01 lb/min. |
| Fluid bed machine temperature Profile used: | |
| Product/Solids temperature in bowl: | 82–84° C. |
| Outlet air temperature: | 81–83° C. |
| Inlet air temperature: | 110–115° C. |
| Spraying Time: 210 min. | |
| Final Product Particle Size: | |
| On U.S. Std. 20 mesh: | 13.6% |
| On U.S. Std. 25 mesh: | 7.6% |
| On U.S. Std. 30 mesh: | 8.8% |
| On U.S. Std. 50 mesh: | 64.5% |
| On U.S. Std. 60 mesh: | 2.2% |
| On U.S. Std. 70 mesh: | 0.9% |
| Thru U.S. Std. 70 mesh | 2.4% |
| Fluid Bed Machine Data - Same as in Table I. | |
| Fluidization Air Velocity at Distributor Plate: 545 ft/min. | |
| Nozzle used: Schlick 6-headed with 1.8 mm Liquid Orifices | |
| Nozzle Atomization air pressure: 6.5–7.0 bar | |
| Nozzle position: 7 inches above bottom flange of expansion chamber. | |

EXAMPLE 4

Potassium chloride was again coated with a solution equivalent in composition to that used in Example 1. The fluid bed machine used was the same as that described in Example 3. Processing data and results were as follows (Table IV):

TABLE IV

| | |
|---|---|
| Amount of potassium chloride charged to granulator bowl: | 1553 lb. |
| Potassium chloride particle size - same as Example 3, Table III | |
| Amount of coating: | 667.25 lb. |
| Amount of each coating ingredient: | |
| Maltodextrin | 330 lb. |
| Sodium Chloride | 330 lb. |
| Cream of Tartar | 7.25 lb. |
| Amount of water in coating solution: | 988.9 lb. |
| Temperature of Coating Solution: | 55–80° C. |
| Solution application rate: | 3.71 lb/min. |
| Fluid bed machine temperature Profile used: | |
| Product/Solids temperature in bowl: | 66–68° C. |
| Outlet air temperature: | 66–68° C. |
| Inlet air temperature: | 91–95° C. |
| Spraying Time: 446 min. | |
| Final Product Particle Size: | |
| On U.S. Std. 20 mesh: | 17.4% |
| Thru U.S. Std. 20 mesh | 82.6% |
| Fluid Bed Machine Data - Same as Example 3, Table III. | |

EXAMPLE 5

Again in this example, potassium chloride was coated with a solution containing maltodextrin, sodium chloride, and cream of tartar. The coating was carried out in a Glatt Spray Granulator Model WSG-300 similar to that used in examples 1 and 2. The solids content of the coating solution was again maintained at approximately 40 wt%. This granulator was set up and operated using conventional criteria, as detailed in Table V. The resulting product was almostly totally comprised of agglomerated groups of particles as evidenced through microscopic examination.

TABLE V

| | |
|---|---|
| Amount of potassium chloride charged to granulator bowl: | 831 lb. |
| Potassium chloride particle size - | |

TABLE V-continued

| | |
|---|---|
| same as detailed in Table I | |
| Amount of coating: | 361.6 lb. |
| Amount of each coating ingredient: | |
| Maltodextrin | 178.8 lb. |
| Sodium Chloride | 178.8 lb. |
| Cream of Tartar | 3.9 lb. |
| Amount of water in coating solution: | 536.5 lb. |
| Temperature of Coating Solution: | 45–90° C. |
| Solution application rate: | 1.87 lb/min. |
| Fluid bed temperature | |
| Profile used: | |
| Outlet air temperature: | 50° C. |
| Inlet air temperature: | 60° C. |
| Spraying Time: 8 hr. | |
| Final Product Particle Size: | |
| On U.S. Std. 20 mesh: | 81% |
| Thru U.S. Std. 20 mesh | 19% |
| Fluid Bed Machine Data: | |
| Fluidization Air Velocity at Distributor Plate: 483 ft/min. | |
| Nozzle used: Schlick 3-headed Two fluid nozzle with | |
| 2.2 mm Liquid Orifices | |
| Nozzle Atomization air pressure: 4.0–4.5 bar | |
| Nozzle position: Approx. 25 inches above bottom flange of | |
| expansion chamber - by visual observation, level | |
| in the expansion chamber that was consistently | |
| reached by the fluidized bed was below the level | |
| of the solution spray nozzle. | |

BEST MODE CONTEMPLATED

The best mode contemplated for carrying out this invention has been set forth in the above description, for example, by way of setting forth preferred materials and operating conditions, including but not limited to preferred ranges and values of amounts and other nonobvious variables material to successfully practicing the invention in the best way contemplated at the time of executing this patent application.

It is understood that the foregoing detailed description is given merely by way of illustration and that many modifications may be made therein without departing from the spirit or scope of the present invention.

What is claimed is:

1. A process for preparing a salt substitute cmposition which comprises coated particles and not more than a minor amount of agglomerates, each particle comprising:
   (a) a core comprising potassium chloride and
   (b) a coating on said core, said coating comprising maltodextrin,
and wherein the dextrose equivalent (DE) value of the combined amount of potassium chloride and maltodextrin is not more than 10 (DE) units, the potassium chloride is present in an amount from about 99 to about 60% and the maltodextrin is present in an amount from about 1 to about 40%, the percentage and units being by weight and based on the weight of said combined amount, the process comprising:
   (A) providing a bed of substantially dry particles comprising crystalline, potassium chloride, to be coated in said bed;
   (B) passing a flow of a gaseous medium upwardly through the bed at a velocity of at least 545 feet per minute fluidizing said bed in an expansion chamber; and
   (C) introducing a fine mist spray of an aqueous solution comprising maltodextrin into said fluidized bed at no higher than about 7 inches from the bottom of said expansion chamber, but below the upper level of the fluidized bed, at an atomization pressure of at least 5 bar to form a coating of said solution onto the surface of said particles,
said gaseous medium effecting evaporation of water from the coated particles, wherein said velocity, said pressure, and said spray location effect a particle flow path or fluidization zone comprising coated particles propelled out of said fluidized bed on a path or zone extending at least two feet above said fluidized bed and returning to said fluidized bed, the particles thereby being returned substantially dry, coated, and containing no more than a minor amount of agglomerates.

2. The process of claim 1 wherein said velocity is at least 625 feet per minute.

3. The process of claim 2 wherein sid velocity is at least 700 feet per minute.

4. The process of claim 3 wherein said velocity is from about 700 to about 760 feet per minute.

5. The process of claim 1 wherein said height is at least 4 feet.

6. The process of claim 1 wherein a chamber is employed for the fluidization and said velocity is at least sufficient for the flow-path height to equal at least 90% of the distance between the upper surface of said bed and the top of the chamber.

* * * * *